Patented Jan. 29, 1952

2,583,534

UNITED STATES PATENT OFFICE 2,583,534

STREPTOMYCIN GLUCURONATE

George W. Mast, Stamford, Conn., assignor to Commercial Solvents Corporation, Terre Haute, Ind., a corporation of Maryland No Drawing. Application December 31, 1949, Serial No. 136,419

1 Claim. (Cl. 260—210)

This invention relates to a salt of streptomycin and glucuronic acid. More specifically it relates to the compound streptomycin glucuronate and a method for preparing same.

The new compound of my invention is produced by reacting an aqueous alkaline earth metal salt of glucuronic acid with an aqueous solution of streptomycin sulphate. The precipitated alkaline earth metal sulphate is removed and the streptomycin glucuronate remains in the reaction mixture.

In carrying out my invention, the cation of the salt of glucuronic acid must be selected carefully due to the type of reaction involved. In the production of my new compound, the cation of the salt of glucuronic acid combines with the sulphate which is introduced as streptomycin sulphate and the latter precipitates out. Salts of glucuronic acid which can be used in my process are alkaline earth metal salts such as barium, calcium, and strontium glucuronate. Magnesium glucuronate cannot be used due to the fact that magnesium sulphate which is formed in the reaction is soluble in the reaction mixture and does not precipitate so that it can be removed. Barium, calcium and strontium are especially suitable due to the fact that they react readily with the lactone of glucuronic acid to form salts of glucuronic acid.

A desirable procedure for preparing the salt of glucuronic acid to be used in producing my new compound consists of first preparing a saturated solution of either barium, calcium, or strontium hydroxide in distilled water, and filtering the undissolved material from the solution. To a solution containing one-half mole of this hydroxide is then added while stirring one mole of glucuronolactone. The resulting solution contains barium, calcium, or strontium glucuronate depending on the hydroxide used. It is to be emphasized, however, that the alkaline earth metal glucuronate can be prepared in any manner and that I am not limited to the process shown above.

In practicing my invention, I use streptomycin sulphate as the other starting material. Other salts of streptomycin are not suitable for various reasons. For example, the chloride cannot be used because the only chloride which can be precipitated is silver chloride; and silver hydroxide, the form in which the silver would be introduced to the reaction, is insoluble in water. The starting materials which I use do not necessarily have to be pure in order for the reaction to proceed but the desired reaction product is greatly improved in purity if the starting materials are as pure as possible. Since the desired reaction product is a chemotherapeutic agent, certain minimum purity standards of the U. S. Food and Drug Administration must be met before it can be used. For example, pure streptomycin base has an activity of 1000 units per milligram, and theoretical streptomycin activity in the streptomycin sulphate is approximately 810 units per milligram. Streptomycin activity in the streptomycin sulphate customarily used varies between 700 and 800 u./mg. When streptomycin sulphate of the latter character is used in my process, streptomycin glucuronate having an activity of from 450 u./mg. up to the theoretical activity of 500 u./mg. is obtained.

In accordance with my invention, I react the streptomycin sulphate and an alkaline earth metal glucuronate at temperatures ranging from 10°–90° C. The higher temperatures can be used throughout the process when the barium and strontium hydroxides are used to produce the alkaline earth metal glucuronate since these hydroxides are more soluble in water at the higher temperatures. Such is not the case with calcium hydroxide, however, and the lower temperatures are preferred when the latter is used.

The glucuronate and streptomycin base combine in a 3 to 1 ratio thus requiring 3 moles of alkaline-earth metal glucuronate and 2 moles of streptomycin sulphate in the reaction mixture. The activity of streptomycin can be used to assist in calculating the amount of streptomycin sulphate to be used in the reaction. For example, assuming that the streptomycin sulphate to be used has an activity of 780 u./mg., and since pure streptomycin has an activity of 1000 u./mg., the streptomycin sulphate contains 78% streptomycin base. Therefore, sufficient streptomycin sulphate must be used so that 78% of the amount used constitutes one mole of streptomycin base.

The time of the reaction is not critical and is gauged by the appearance of precipitates at the different stages of the reaction. For example, when the streptomycin sulphate is added to the alkaline earth metal glucuronate solution, stirring is continued until precipitation of the alkaline earth metal sulphate is completed. The streptomycin glucuronate can then be recovered from the resulting filtrate as described below.

In carrying out my invention, I mix the solution of one mol of glucuronate, in the form of alkaline earth metal glucuronate with one-third mol of streptomycin base, in the form of streptomycin sulphate, dissolved in distilled water. The sulphate precipitates as the alkaline earth metal sulphate and is removed by filtration or other suitable means. The residue is diluted with an inert water-miscible liquid which causes the product to precipitate from the aqueous solution. The inert liquid-water layer is separated, and additional inert liquid added to insure that all of the product has precipitated. The product is then removed by any suitable means and dried. This produces a dry solid form of streptomycin glucuronate but in some instances it can be satisfactorily used in the dilute aqueous solution form obtained after the removal of the alkaline earth metal sulphate. However, it is generally desirable to recover the product as the dry solid, as indicated above, or by evaporation or other suitable means. The compound is a salt of streptomycin and glucuronic acid. (Nitrogen: found 8.2%, theory 8.43%.) It retains its antibiotic activity over an extended period of time whereas the streptomycin base is very unstable and loses its activity completely in a few hours.

The inert water-miscible liquid which I add to the final mixture consists of any water-miscible liquid which is inert toward streptomycin sulphate, alkaline earth metal glucuronate and streptomycin glucuronate. Ethers such as dioxane, ketones such as acetone and lower aliphatic alcohols such as methanol, ethanol, and propanol are suitable, although I prefer to use acetone.

As a preferred method of carrying out my invention I add to an aqueous solution of 1 mol of glucuronolactone, an aqueous solution of 0.5 mol of barium hydroxide while stirring. To the stirred solution of the resulting barium glucuronate, I add one-third mol of streptomycin base in the form of streptomycin sulphate dissolved in approximately 300 mls. of distilled water. Stirring is continued until barium sulphate is completely precipitated. The barium sulphate is removed by filtration and sufficient acetone is added to the filtrate to precipitate the streptomycin glucuronate. The amount of acetone added is approximately three times the volume of the filtrate. Stirring is continued, the acetone-water layer is removed and additional acetone is added to the reaction mixture until the streptomycin glucuronate is free of water as indicated by the yellowish-white appearance of the streptomycin glucuronate. The precipitate is then removed by filtration and air dried. The operation is preferably carried out at room temperature.

EXAMPLE I

The results given in the following table are presented to illustrate my invention. The procedure used was the preferred procedure as indicated above.

Table I

| Run | Mols of Glucuronate as Alkaline Earth Metal Glucuronate | Mols of Streptomycin Base Mol Wt. 581.6 | Gms. of Streptomycin Sulphate | Gms. of Streptomycin Glucuronate Isolated | Assay on Product (Theory) 500 u./mg.[1] | Per Cent Recovery Calcd. on units of Streptomycin Base Used |
|---|---|---|---|---|---|---|
| | | Mol. | | | u./mg. | Per cent |
| 1 | 1.0 | 1/3 | 273.04 | 367 | 497 | 96 |
| 2 | 1.0 | 1/3 | 273.04 | 382 | | |
| 3 | 1.0 | 1/3 | 273.04 | 371 | | |
| 4 | 1.0 | 1/3 | 273.04 | 368 | 468 | 88 |
| 5 | 1.0 | 1/3 | 273.04 | 372 | | |
| 6 | 0.8 | 0.8/3 | 218.40 | 294 | | |
| 7 | 1.0 | 1/3 | 273.04 | 773 | | |
| 8 | 1.0 | 1/3 | 273.04 | | 465 | 92 |
| 9 | 1.025 | 1.025/3 | 279.60 | 780 | | |
| 10 | 1.0 | 1/3 | 273.04 | | | |
| 11 | 1.0 | 1/3 | 263.00 | 383 | | |

[1] Average of two assays on each combined run.

EXAMPLE II

An experiment was carried out using the preferred procedure described above except that 1,4-dioxane was used as the water-miscible solvent for precipitating the streptomycin glucuronate. The results are shown in Table II.

Table II

| Mols of Glucuronate as Alkaline Earth Metal Glucuronate | Mols of Streptomycin Base | Gms. of Streptomycin Sulphate | Gms. of Streptomycin Glucuronate Isolated | Assay on Product (Theory) 500 u./mg. | Per Cent Recovery Calcd. on Units of Streptomycin base used |
|---|---|---|---|---|---|
| .02 | .02/3 | 5.14 | 7.2 | u./mg. 475 | Per cent 88 |

EXAMPLE III

An experiment was carried out using the preferred procedure described above except that ethyl alcohol was used as the water-miscible solvent for precipitating the streptomycin glucuronate. The results are shown in Table III.

Table III

| Mols of Glucuronate as Alkaline Earth Metal Glucuronate | Mols of Streptomycin Base | Gms. of Streptomycin Sulphate | Gms. of Streptomycin Glucuronate Isolated | Assay on Product (Theory) 500 u./mg. | Per Cent Recovery Calcd. on Units of Streptomycin base used |
|---|---|---|---|---|---|
| .02 | .02/3 | 5.14 | 6.39 | u./mg. 419 | Per cent 70 |

My process consistently produces high yields of streptomycin glucuronate. Based on the units of streptomycin base contained in the streptomycin sulphate, yields of from 88% to 95% are obtained. The yield can be calculated on a weight basis or on an activity basis, but the yield on the basis of activity gives a truer picture since the value of the product depends on its having streptomycin activity. To get a 100% yield on a weight basis but to have the activity lost in the process would make the process and product worthless. Consequently, yields are figured on the basis of units per milligram of streptomycin entering and leaving the reaction. The per cent yields therefore depend in part on the accuracy of the assays which are correct only to plus or minus 10%. Furthermore, the yields also depend on the recovery method used. In the case of the acetone method for the removal of water and consequent precipitation of the product, the yield depends on the completeness of the water removal.

Streptomycin glucuronate produced in accordance with my invention ordinarily possesses 93–99% of the activity of the streptomycin base from which it is produced. It is pyrogen free and passes the safety tests of the U. S. Food and Drug Administration for streptomycin. The safety test requires that when 1000 units of streptomycin are injected intravenously into each of five laboratory test mice, all must survive for 72 hours.

The product of my invention besides being non-toxic is stable both in powdered form and in liquid form. Table IV shows the results of a stability test carried out at room temperature on the dry powdered form of streptomycin glucuronate. The compound was stored in rubber stoppered 20 cc. serum-type vials for the periods indicated.

*Table IV*

| Months of Storage | Assay in Units/mg. |
|---|---|
| 0 | 512 |
| 4 | 492 |
| 6 | 470 |

Table V shows the results of stability tests carried out at different temperatures using the liquid form of streptomycin glucuronate.

This liquid form was also stored in rubber stoppered 20 cc. serum-type vials for the periods indicated.

*Table V*

| Temp. ° C. | Months of Storage | Assay in Units/ml. |
|---|---|---|
| Room | 0 | 26,312 |
|  | 1 | 24,480 |
|  | 2 | 24,000 |
|  | 3 | 23,280 |
| 0°5 | 0 | 25,813 |
|  | 1 | 25,155 |
|  | 2 | 23,500 |
|  | 3 | 23,480 |
| 37° | 0 | 25,313 |
|  | 1 | 22,200 |
|  | 2 | 20,500 |
|  | 3 | 19,400 |

The compound streptomycin glucuronate is exceptionally useful in the treatment of urinary infections. This type of infection is caused by gram negative bacteria, such as *Aerobacter aerogenes*, and Pseudomonas. Patients suffering from such infections show negative tests for these organisms in from 4 to 7 days when treated with streptomycin glucuronate. Altho patients treated with streptomycin glucuronate may develop vestibular disturbances it ordinarily takes at least three times as much streptomycin in the form of streptomycin glucuronate as it does with streptomycin sulphate or the calcium chloride complex of streptomycin. Other gram-negative bacteria such as *Escherichia coli* are also susceptible to the bactericidal activity possessed by streptomycin glucuronate.

What I claim is:

As a new composition of matter, streptomycin glucuronate.

GEORGE W. MAST.

REFERENCES CITED

The following references are of record in the file of this patent:

UNITED STATES PATENTS

| Number | Name | Date |
|---|---|---|
| 2,462,175 | Folkers | Feb. 22, 1949 |
| 2,501,014 | Wintersteiner et al. | Mar. 21, 1950 |
| 2,509,191 | Lott et al. | May 23, 1950 |

FOREIGN PATENTS

| Number | Country | Date |
|---|---|---|
| 607,186 | Great Britain | Aug. 26, 1948 |

OTHER REFERENCES

Bustinza, Squibb Abstract Bull., Feb. 2, 1949, P. A-93, 1 page.

O'Keeffe et al., J. A. C. S., v. 71 (1949), p. 2452.